Oct. 29, 1929.    F. A. SMITH    1,733,319
RING TYPE TIRE CARRIER
Filed Dec. 23, 1927    2 Sheets-Sheet 1

INVENTOR.
F. A. Smith
BY
Bacon & Thomas
ATTORNEYS

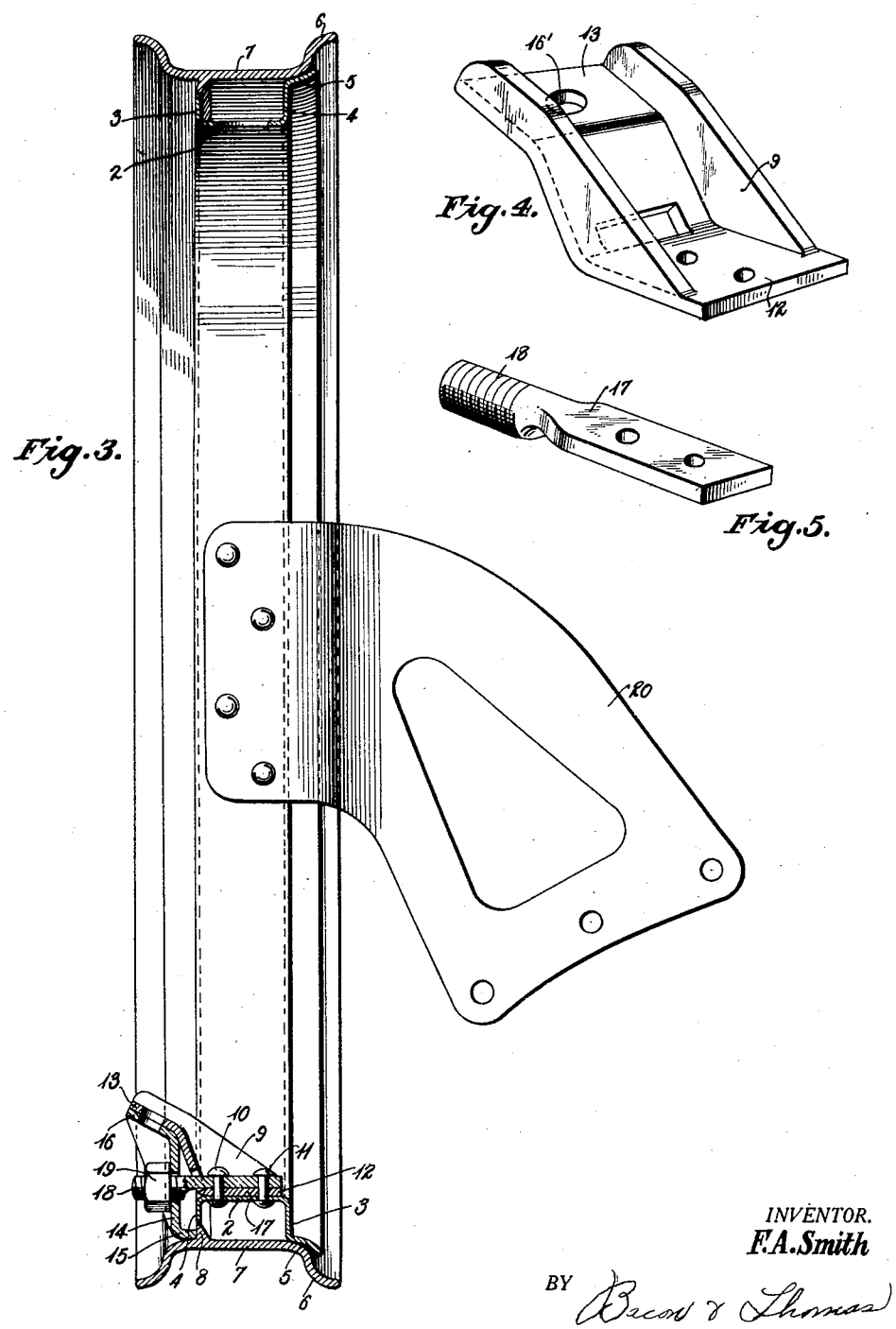

Patented Oct. 29, 1929

1,733,319

UNITED STATES PATENT OFFICE

FREDRICK ARTHUR SMITH, OF INDIANAPOLIS, INDIANA, ASSIGNOR, BY MESNE ASSIGNMENTS, TO DETROIT AND SECURITY TRUST COMPANY, A CORPORATION OF MICHIGAN

RING-TYPE TIRE CARRIER

Application filed December 23, 1927. Serial No. 242,185.

This invention relates to tire carriers for automobiles.

The primary object of the invention is to provide a ring type tire carrier of substantially channel shaped cross-section and having an integral circumferential outwardly extending flange constituting a seating portion engageable with the side beading of a supported automobile rim.

Another object of the invention is to provide a tire carrier with a ring having two circumferential vertical walls or flanges extending in an upward direction and defining a recess therebetween with the innermost of said flanges located in substantially the same vertical plane and closely positioned to the circumferential lip provided by the demountable rim supported.

Another object of the invention is to provide a tire carrier which is extremely inexpensive to manufacture and is compact, durable, free from distortion, due to rough usage, and upon which a demountable rim may be placed or removed with a minimum of ease.

The invention further comprehends the provision of a novel form of "clip" and spring clamp cooperative therewith for securely clamping the demountable rim in place and affording means whereby the same may be locked if desired.

Numerous other objects of a subordinate nature will be apparent to those skilled in the art from a reading of the following specification in conjunction with the drawings attached hereto and forming a part thereof, in which—

Fig. 3 is a sectional view on line 3—3 of Fig. 1,

Figs. 4 and 5 are detail perspective views.

Figure 1:
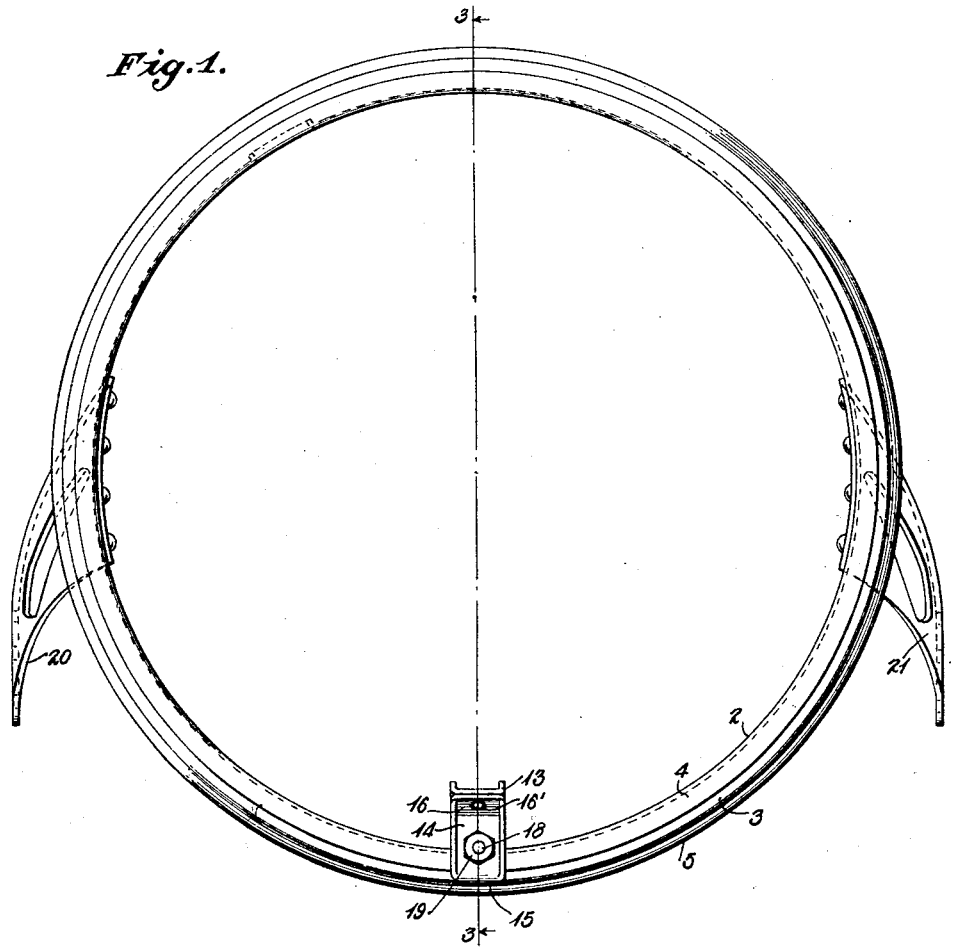
Fig. 1 represents a front elevation of the tire carrier.
Figure 2:
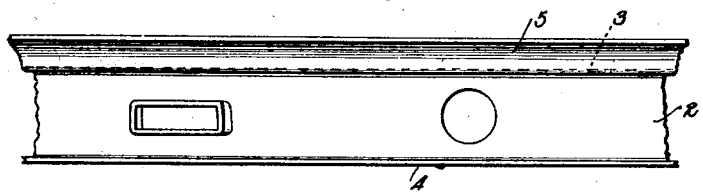
Fig. 2 is a fragmentary edge view.

Referring now to the drawing, I have shown one form of construction for the purpose of illustrating the invention, but it will, of course, be apparent that equivalent constructions may be employed within the scope of my invention as defined in the claims.

The ring shown is of cross-sectional shape as illustrated in Fig. 3. It comprises a base portion 2 and two integral substantially vertically disposed flanges 3 and 4. The inner flange 3 is provided with an integral outwardly extending circumferential portion 5 adapted to afford a seating engagement for the side bead 6 of the demountable rim 7 supported by the carrier and functions to resist inward movement of the supported rim and tire relative to the carrier. The rim shown is of a modern type known in the trade as a "Kelsey" rim and is provided with a circumferential inwardly extending lip 8. This lip is in substantially the same vertical plane and closely approaches the extremity of the outer flange 4 as clearly shown in the drawing. It will be apparent that the carrier is adapted to support equivalent types of modern rims and the invention is not restricted to the exact configuration of the rim illustrated.

In order to securely hold and lock the supported rim and tire on the carrier, I provide a novel form of fastener clip and rim clamp. The member 9, hereinafter called a "clip" is secured to the base 1 of the carrier, preferably, though not necessarily, by rivets 10 and 11. This clip is of substantially Z-shaped formation and is provided with an inturned portion 12 riveted to the base 2 by the rivets 10 and 11 aforesaid. The other portion of the clip is bent outwardly as shown at 13. Cooperating with this "clip" is the spring clamp 14 which is likewise provided with an inturned portion 15 and an out-turned portion 16, the latter substantially conforming to the extremity of the clip portion 13. Both the clip and the clamp are provided with aligned apertures 16' for the reception of a padlock or other locking device, the locking device to prevent surreptitious removal of the rim carrier. The rim is provided with an inwardly extending lip 8, above referred to, which is engaged by the inturned portion 15 of the spring clip to maintain the supported rim and tire in tight engagement with the seating flange 5 of the ring. A bolt 17 is preferably provided and is secured to the base 2 with the same means that are employed to secure the clip thereto, namely, the rivets or equivalent fastening devices 10 and 11. This bolt is exteriorly screw-threaded as shown at 18 in order to receive the adjustable nut 19 serving to press the spring clamp into tight engagement with the clip portion 13 and the demountable rim lip 8, respectively.

The supporting ring is adapted to be secured to the vehicle by suitable supporting arms 20 and 21.

From the foregoing, it will be observed that the carrier herein shown is of an extremely simple nature and can be made entirely of sheet metal, save for the nut and bolt. Due to the channel shaped cross-sectional formation of the ring, the rim and tire may be placed in position or removed with a minimum of ease and without the laborious effort necessary with existing types of carriers. There is no danger of the rim "sweating" or rusting on the carrier which would require considerable manual effort and tools to effect removal. Moreover, due to the compact and strong character of the ring, there is no likelihood of it becoming distorted at any point. The channel shaped cross section to the ring, with the integral outwardly extending seating flange, gives to the carrier a most pleasing appearance, and lends to it great strength and durability. Many types of rims are provided with a multiplicity of anti-gripping extensions, and these are taken care of in the present channel shaped ring without the necessity and expense of forming numerous perforations therein, all of which serve to materially weaken the rim as a whole.

As hereinbefore stated, I have illustrated one preferred and satisfactory type of carrier, but I desire it to be understood that many changes in the arrangement of parts may be made within the scope of my invention as expressed in the following claims.

Having thus described my invention, what I claim is:

1. A spare tire carrier for automobiles comprising a supporting ring, means for securing said ring to an automobile body, said ring being of generally channel shaped formation and having a circumferential seating extension engageable with the side bead of a supported rim, and an outer flange of the ring located in substantially vertical alignment with the circumferential lip of the supported demountable rim, means for clamping the supported ring in position on the carrier, said means comprising a fastener clip secured to the ring and a spring clamp cooperating therewith, the clamp engaging the fastener clip at one point and provided with an inturned portion at the other point engageable with the demountable rim, to thereby provide a two point contact for the fastener clamp and demountable rim respectively, a bolt secured to the carrier and extending through the clamp intermediate its top and bottom and a nut engaging said bolt and abuttingly engaging the rim clamp to fix the rim on the carrier.

2. A ring type tire carrier comprising a ring having an upwardly and outwardly extending flange constituting a seating portion for the supported demountable rim, means for maintaining the supported rim in position on said carrier, said means comprising a clip having oppositely extending terminal portions, one of which is secured to the carrier, a substantially Z-shaped spring clamp having an inturned portion engageable with the rim and an out-turned portion engageable with the clip to thereby provide a two point contact, and means for adjusting said clamp into and out of positions.

3. A ring type tire carrier comprising a ring having an upwardly and outwardly extending flange constituting a seating portion for the supported demountable rim, means for maintaining the supported rim in position on said carrier, said means comprising a clip having a horizontal portion secured to the carrier ring, said clip having an aperture for the reception of a bolt fastened to the carrier ring, a spring clamp mounted on the bolt and having a two point contact with the demountable rim and clip respectively and a nut threadedly secured to the bolt for moving the spring clamp into tight engagement with the clip and demountable rim, respectively.

4. A ring type carrier comprising a ring having an upwardly and outwardly extending flange constituting a seating portion for the demountable rim supported thereon, a vertically disposed flange of straight configuration provided by the adjacent side of said carrier and in substantial alignment with the vertically disposed flange provided by the rim, means for maintaining the supported rim in position on said carrier, said means comprising a clip of substantially channel-shaped cross section and having a horizontal portion secured to the carrier ring and an intermediately apertured portion for the reception of a bolt fastened to the carrier ring and extending through said aperture, a clamp mounted on the bolt having a spaced two point contact with the clip and rim respectively and a nut threadedly secured to the bolt for moving the clamp into engagement with the lip of the demountable rim and the clip respectively to thereby maintain the rim in position on the carrier.

In testimony whereof I affix my signature.

FREDRICK ARTHUR SMITH.